United States Patent
Nair et al.

(10) Patent No.: US 7,346,109 B2
(45) Date of Patent: Mar. 18, 2008

(54) MOTION VECTOR COMPUTATION FOR VIDEO SEQUENCES

(75) Inventors: Hari N. Nair, Bangalore (IN); Gordon Petrides, San Jose, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 809 days.

(21) Appl. No.: 10/832,838

(22) Filed: Apr. 26, 2004

(65) Prior Publication Data

US 2005/0135482 A1    Jun. 23, 2005

Related U.S. Application Data

(60) Provisional application No. 60/532,427, filed on Dec. 23, 2003.

(51) Int. Cl.
| | |
|---|---|
| H04N 7/12 | (2006.01) |
| H04N 11/02 | (2006.01) |
| H04N 11/04 | (2006.01) |
| H04B 1/06 | (2006.01) |

(52) U.S. Cl. ................................. 375/240.16
(58) Field of Classification Search ............. None
See application file for complete search history.

(56) References Cited

U.S. PATENT DOCUMENTS

| | | | |
|---|---|---|---|
| 4,980,764 A | 12/1990 | Henot | |
| 5,259,040 A | 11/1993 | Hanna | |
| 5,317,397 A | 5/1994 | Odaka et al. | |
| 5,786,872 A | 7/1998 | Miyazaki et al. | |
| 6,278,736 B1 | 8/2001 | De Haan et al. | |
| 6,349,114 B1 | 2/2002 | Mory | |
| 6,658,059 B1 | 12/2003 | Iu et al. | |
| 7,203,237 B2 * | 4/2007 | Fernandes | 375/240.16 |
| 2002/0113901 A1 | 8/2002 | Osberger | |

(Continued)

FOREIGN PATENT DOCUMENTS

EP    0 242 935 A1    10/1987

(Continued)

OTHER PUBLICATIONS

Singapore Examination Report dated Mar. 23, 2007 from corresponding Singapore Application No. 200407680-8.

(Continued)

*Primary Examiner*—Nhon Diep
(74) *Attorney, Agent, or Firm*—Beyer Weaver LLP

(57) ABSTRACT

Methods and apparatus, including computer program products, implementing and using techniques for computing motion vectors in a digital video sequence are disclosed. A recursive hierarchical method is used to determine a motion vector by using multiple resolution levels of the image frames. A best motion vector is first determined for the lowest resolution level. The best motion vector is propagated to a higher resolution level, where some adjustments are made and a new best motion vector is determined. The new best motion vector is propagated to yet another higher resolution level, where more adjustments are made and another new best motion vector is determined. This process is repeated until the highest, original, resolution level has been reached and a best motion vector has been identified. The identified best motion vector at the original resolution level is used for performing motion compensation.

28 Claims, 5 Drawing Sheets

U.S. PATENT DOCUMENTS

| | | | |
|---|---|---|---|
| 2002/0163969 | A1 | 11/2002 | Zhong et al. |
| 2002/0196362 | A1 | 12/2002 | Yang et al. |
| 2003/0072373 | A1 | 4/2003 | Sun |
| 2003/0086498 | A1 | 5/2003 | Lee et al. |
| 2003/0156646 | A1* | 8/2003 | Hsu et al. ............. 375/240.16 |
| 2004/0120401 | A1* | 6/2004 | Linzer et al. .......... 375/240.16 |
| 2004/0202250 | A1* | 10/2004 | Kong et al. ............ 375/240.16 |
| 2005/0013365 | A1 | 1/2005 | Mukerjee |
| 2007/0092111 | A1* | 4/2007 | Wittebrood et al. ........ 382/107 |

FOREIGN PATENT DOCUMENTS

| | | |
|---|---|---|
| EP | 0 294 956 A2 | 5/1988 |
| EP | 0 376 330 A2 | 7/1990 |
| EP | 0 466 981 A1 | 7/1990 |
| EP | 1 117 251 A1 | 7/2001 |
| EP | 1 587 328 A2 | 10/2005 |
| GB | 2 286 740 A | 8/1995 |
| GB | 2 311 183 A | 9/1997 |
| WO | 87/05770 | 9/1987 |
| WO | 94/06098 | 3/1994 |
| WO | 00/30359 | 5/2000 |
| WO | 02/09611 A2 | 2/2002 |
| WO | WO 02/09611 A2 | 2/2002 |
| WO | 02/19721 A2 | 3/2002 |

OTHER PUBLICATIONS

Vella et al., "Digital Image Stabilization by Adaptive Block Motion Vectors Filtering," IEEE Transactions on Consumer Electronics, vol. 48, No. 3, Aug. 2002, XP-002284976.

Park et al., "Robust estimation of camera parameters from image sequence for video composition," Signal Processing Image Communication, Elsevier Science Publishers, Amsterdam, NL, vol. 9, No. 1, Nov. 1996, pp. 43-53, XP004071578.

Migliorati et al., Multistage motion estimation for image interpolation, Signal Processing Image Communication, Elsevier Science Publishers, Amsterdam, NL, vol. 7, No. 3, Sep. 1995, pp. 187-199, XP004047102.

International Search Report dated Jan. 12, 2006 from corresponding International Application No. EP 04 25 7855.

Choi et al., "Motion Adaptive 3D Y/C Separation Algorithm Using Motion Estimation and Motion Compensation," IEEE Transactions on Consumer Electronics, vol. 47, No. 4, Nov. 2001, pp. 770-778.

International Search Report dated Jun. 1, 2005 from European Patent Application EP 04 25 8048.

Jostschulte et al., "A Subband Based Spatio-Temporal Noise Reduction Technique for Interlaced Video Signals," pp. 438-439, International Conference on Consumer Electronics, Los Angeles, CA, Jun. 2-4, 1998.

Jostschulte et al., "Perception Adaptive Temporal TV-Noise Reduction Using Contour Preserving Prefilter Techniques," IEEE Transactions on Consumer Electronics, vol. 44, No. 3, pp. 1091-1096.

de Haan et al., "Television Noise Reduction IC," IEEE Transactions on Consumer Electronics, vol. 44, No. 1, Feb. 1998, pp. 143-154.

Ryu, et al., "Deinterlacing Using Motion Compensated Local Spectra, " Proceedings of Asilomar-29, IEEE 1996, pp. 1394-1397.

Ohm et al., "Variable-Raster Multiresolution Video Processing With Motion Compensation Techniques," Proceedings IEEE 4th International Conference on Image Processing (ICIP-97), vol. 1, pp. 759-762, Oct. 1997.

Gerard de Haan, "IC For Motion Compensated De-Interlacing, Noise Reduction, and Picture Rate Conversion," IEEE Transactions on Consumer Electronics, vol. 45, Aug. 1999, pp. 617-624.

Braun et al., "Motion-Compensating Real-Time Format Converter for Video on Multimedia Displays," Proceedings IEEE 4th International Conference on Image Processing (ICIP-97), vol. 1, pp. 125-128, Oct. 1997.

Kalevo et al., "Motion Compensated Deinterlacing," 1993 IEEE, pp. 40-41.

de Haan et al., "Real-Time 2-3 Pull-Down Elimination Applying Motion Estimation/Compensation in a Programmable Device," Consumer, vol. 44, No. 3, Aug. 1998, pp. 930-938.

Patti et al., "A New Motion-Compensated Reduced-Order Model Kalman Filter for Space-Varying Restoration of Progressive and Interlaced Video," IEEE Transactions on Image Processing, vol. 7, No. 4, Apr. 1998, pp. 543-554.

Delogne et al., "Improved Interpolation, Motion Estimation, and Compensation for Interlaced Pictures," IEEE Transactions on Image Processing, vol. 3, No. 5, Sep. 1994, pp. 482-491.

Gu et al., "IIR Digital Filters for Sampling Structure Conversion and Deinterlacing of Video Signals," ISCAS 1995, pp. 973-976.

de Haan, et al., "De-Interlacing of Video Data," IEEE Transactions on Consumer Electronics, vol. 43, No. 3, Aug. 1997, pp. 819-825.

Thomas, "A Comparison of Motion-Compensated Interlace-To-Progressive Conversion Methods," BBC Research and Development Report, 1996.

Bellers et al., "Advanced De-Interlacing Techniques," Proceedings ProRISC/IEEEE Workshop on Circuits, Systems and Signal Processing, Mierlo, The Netherlands, Nov. 1996, pp. 7-17.

Kwon et al., "Deinterlacing Using Directional Interpolation and Motion Compensation," IEEE Transactions on Consumer Electronics, vol. 49, No. 1, Feb. 2003, pp. 198-203.

Vandendorpe et al., "Generalized Interpolators for Advanced Movement-Compensated 50Hz-60Hz Conversion of Interlaced Sequences," ICIP 1995, pp. 2237-2240.

Schu et al., "System on Silicon-IC for Motion Compensated Scan Rate Conversion, Picture-In-Picture Processing, Split Screen Applications and Display Processing," Digest of the ICCE 99 Conference, pp. 172-173, Jun. 1999.

Kalevo et al., "Deinterlacing of Video Signals Using Nonlinear Interpolation With Simple Motion Compensation," Signal Processing Laboratory, Tampere University of Technology, pp. 4.1-4.6.

Liang, "Phase-Correlation Motion Estimation," EE 392J, Final Project, pp. 1-9.

Sun, "De-Interlacing of Video Images Using a Shortest Path Technique," IEEE Transactions on Consumer Electronics, vol. 47, No. 2, May 2001, pp. 225-230.

Oh et al., "Spatio-Temporal Edge-Based Median Filtering for Deinterlacing," Proceedings of the International Conference on Consumer Electronics, 2000, Los Angeles, CA, Jun. 2000, pp. 52-53.

Kovacevic et al., "Deinterlacing by Successive Approximation," IEEE Transactions on Image Processing, vol. 6, No. 2, Feb. 1997, pp. 339-344.

Choi et al., "Motion Adaptive 3D Y/C Separation Algorithm Using Motion Estimation and Motion Compensation," IEEE Transactions on Consumer Electronics, vol. 47, No. 4, Nov. 2001, pp. 770-778.

International Search Report dated Jun. 1, 2005 from European Patent Application EP 04 25 8048.

* cited by examiner

MOTION VECTOR COMPUTATION FOR VIDEO SEQUENCES

CROSS REFERENCE TO RELATED APPLICATIONS

This application claims benefit of priority from U.S. Provisional Patent Application No. 60/532,427, filed Dec. 23, 2003, and entitled "RECURSIVE HIERARCHICAL MOTION COMPENSATED FRAME RATE CONVERSION," which is hereby incorporated by reference herein. This application is also related to U.S. Patent Application entitled: "TEMPORAL MOTION VECTOR FILTERING" by Nair, filed concurrently herewith, which is hereby incorporated by reference herein in its entirety.

BACKGROUND

This invention relates to improving video and graphics processing.

At low display refresh rates (for example, 50 fields/sec for interlaced video material, and 24 frames/sec for film-originated material) on progressive digital display devices, a display artifact referred to as "area flicker" can occur. The area flicker becomes more visible as the size of the display increases, due to the high sensitivity to flicker in the human visual peripheral region. A simple solution for reducing the area flicker is to increase the display refresh rate by repeating the input fields or frames at a higher rate (for example, 100 fields/sec for interlaced video). This solves the area flicker problem for static scenes. However, the repetition introduces a new artifact in scenes with motion, known as "motion judder" or "motion smear," particularly in areas with high contrast, due to the human eye's tendency to track the trajectory of moving objects. For this reason, motion compensated frame interpolation is preferred, in which the pixels are computed in an interpolated frame or field at an intermediate point on a local motion trajectory, so that there is no discrepancy between an expected image motion due to eye tracking and a displayed image motion. The local image motion trajectory from one field or frame to the next is described by a motion vector.

Motion vectors can be computed at different levels of spatial resolution, such as at a pixel level, at an image patch level, or at an object level. Computing a motion vector for every pixel independently would theoretically result in an ideal data set, but is unfeasible due to the large number of computations required. Computing a motion vector for each image patch reduces the number of computations, but can result in artifacts due to motion vector discontinuities within an image patch. Computing motion vectors on an object basis can theoretically result in high resolution and lower computational requirements, but object segmentation is a challenging problem.

Therefore what is needed is a way to determine motion vectors efficiently and accurately, such that little or no discrepancy exists between an expected image motion due to eye tracking and a displayed image motion in a digital video.

SUMMARY

The present invention provides methods and apparatus for determining motion vectors efficiently and accurately, such that little or no discrepancy exists between an expected image motion due to eye tracking and a displayed image motion in a digital video.

In general, in one aspect, the invention provides methods and apparatus, including computer program products, implementing and using techniques for computing motion vectors in a digital video sequence. A first image frame is received at a first resolution. The first image frame includes several image patches that each has a respective first position. A second image frame is received at the first resolution. The second image frame includes one or more image patches corresponding to the image patches in the first image frame, and each image patch has a respective second position. A motion vector is determined for each image patch in the first image frame that has a corresponding image patch in the second image frame. The determination includes generating two or more copies of each of the first and second image frames, each copy having a different, lower, resolution than the first resolution, and selecting a best motion vector among a plurality of vectors at each resolution. The determined motion vector is used to establish an intermediate position of the image patch in an interpolated frame that is intermediary to the first and second frames.

Advantageous implementations can include one or more of the following features. The determination can include: a) selecting a copy of the first image frame at the lowest resolution; b) selecting a motion vector determined for a previous pair of image frames; c) projecting the selected motion vector to the selected copy of the first image frame; d) generating one or more update vectors in the selected copy of the first image frame; e) selecting a new best motion vector among the projected vector and the update vectors; f) selecting a new copy of the first image frame with a higher resolution level; g) repeating steps c) through f) until the first resolution is reached; and h) using the selected best motion vector at the first resolution level as the determined motion vector. Each image patch can include a plurality of pixels, and can, for example, be 8 by 8 pixels.

Generating two or more copies can include generating two copies of each of the first and second image frames, each copy having a different, lower, resolution than the first resolution. Selecting a motion vector can include selecting a zero vector to be the motion vector if no continuity exists between the pairs of image frames, or if no previous image frame exists. Selecting a motion vector can include filtering the motion vector determined from the previous pair of image frames.

Filtering can include determining a vector median in a set of two or more motion vectors for the previous pair of image frames. Filtering can include performing a temporal partitioning procedure in a set of two or more motion vectors for the previous pair of image frames. Generating one or more update vectors can include generating one or more vectors that have the same origin as the selected motion vector and that end at different pixels in a horizontal direction or a vertical direction from the pixel where the selected motion vector ends. The update vectors can end at pixels that are separated by one or more pixels horizontally or vertically from the pixel where the selected motion vector ends.

Selecting a new best motion vector can include for each of the selected motion vector and the update vectors: centering a first window on a pixel in the first image frame that forms an origin of the vector; centering a second window on a pixel in the second image frame that forms an end point of the vector, the second window having the same dimensions as the first window; determining a sum of absolute differences of luma values for the pixels in the first window and pixels at corresponding positions in the second window; and selecting as the new best motion vector a vector that has a minimum sum of absolute differences. The dimensions of the first and second windows can be identical to the dimensions of the image patch. Determining can further include projecting a camera vector to the selected copy of the first image frame, the camera vector describing a global motion between the first and second image frames, and selecting a new best motion vector among the projected vector, the update vectors, and the camera vector.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION OF THE INVENTION

The present invention provides methods and apparatus for determining motion vectors efficiently and accurately, such that little or no discrepancy exists between an expected image motion due to eye tracking and a displayed image motion in a digital video. This is accomplished by using a recursive hierarchical approach to determining motion vectors.

Generally, for motion compensated approaches to work well, including the recursive hierarchical approach described herein, two basic assumptions are made about the nature of the object motion: 1) moving objects have inertia, and 2) moving objects are large. The inertia assumption implies that a motion vector changes only gradually with respect to a temporal vector sampling interval (that is, the frame rate in the digital video). The large objects assumption implies that a motion vector changes only gradually with respect to a spatial vector sampling interval, that is, the vector field is smooth and has only few boundary motion discontinuities.

The goal of the recursive hierarchical method is to find a motion vector by applying a source correlation window to a first image frame and a target correlation window to a subsequent image frame, and placing the target correlation window such that a best match with the source correlation window is obtained, that is, the contents of the source correlation window and target correlation window are as similar as possible. At the same time, the number of calculations needed to perform the matching between the source correlation window and the target correlation window must be as low as possible, while still searching the entire vector space limit. In order to accomplish these goals, the recursive hierarchical method uses multiple resolution levels of the image frames. A best motion vector is first determined for the lowest resolution level by projecting the previous best motion vector at the highest resolution level down to the lowest resolution level, and testing it and one or more updates. This best motion vector is then propagated up to a higher resolution level, where some adjustments are made and a new best motion vector is determined. This new best motion vector is propagated up to yet another higher resolution level, where more adjustments are made and another new best motion vector is determined. This process is repeated until the highest, original, resolution level has been reached and a best motion vector has been identified.

Figure 1:
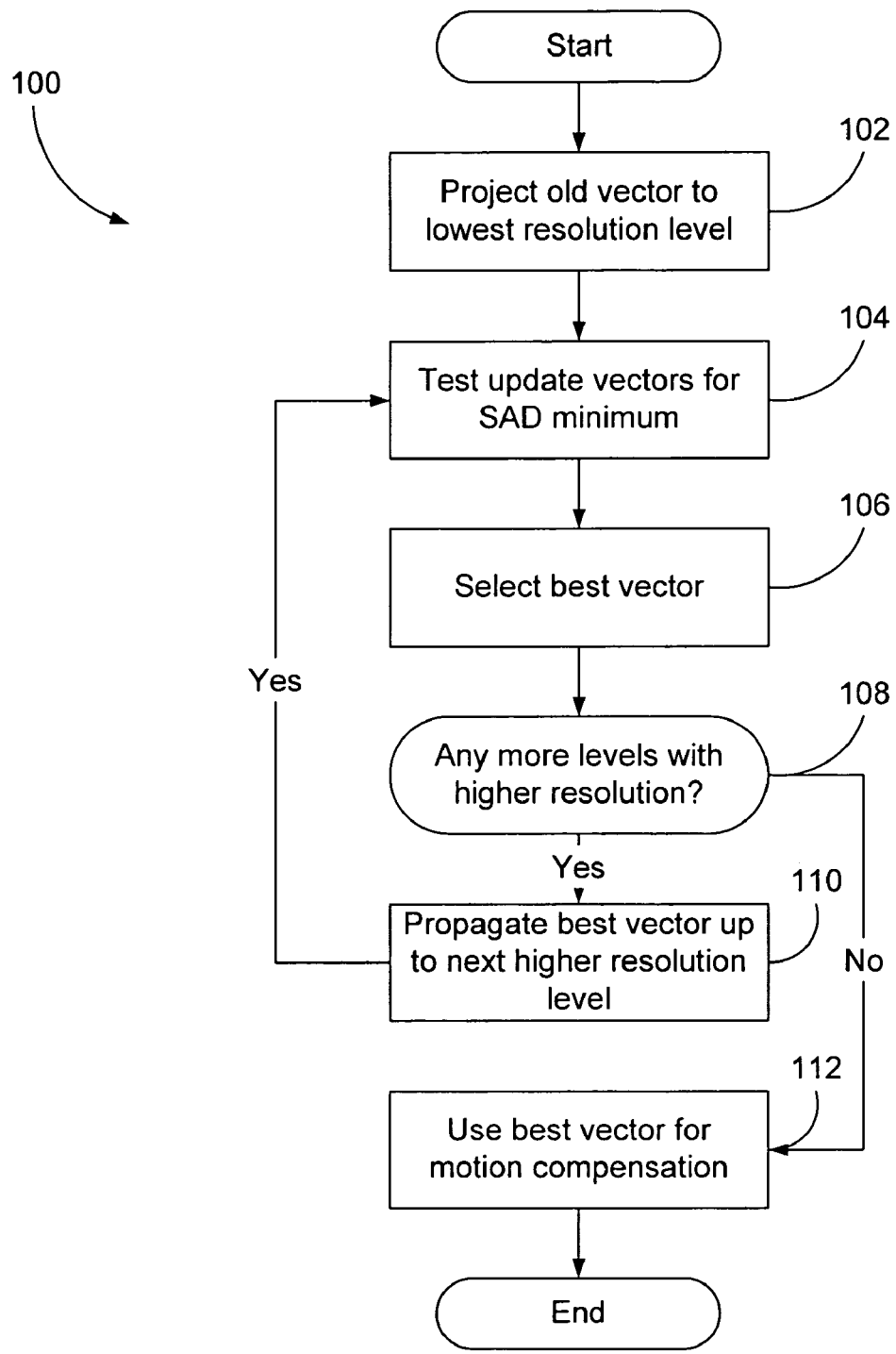
FIG. 1 shows a flowchart of a recursive hierarchical process for determining a motion vector.

FIG. 1 shows one implementation of a recursive hierarchical process (100). It is assumed that multiple resolution levels of the image frames have already been generated. As can be seen in FIG. 1, the recursive hierarchical process (100) for determining a motion vector starts by projecting a motion vector from a previous image frame down to a lowest resolution level (step 102). A set of update vectors is generated and tested to find a best motion vector at this lowest resolution level (step 104). In one implementation this test is performed by comparing pixels in corresponding positions in a source correlation window centered on the origin of the motion vector and a target correlation window centered on the end point of each respective update vector. The comparison can, for example, be performed by subtracting a luma value for each pixel in the source window from the corresponding pixel in the respective target windows. In this case the best match would be defined by finding a minimum sum of absolute differences (SAD) for a source correlation window and a target correlation window pair, and the best motion vector would be the vector associated with this source correlation window and a target correlation window pair.

After the minimum SAD has been found, the best vector is selected (step 106). The process (100) then examines whether there are any higher resolution levels (step 108). If there are higher resolution levels, the process propagates the best vector up to the next higher resolution level (step 110) and repeats steps 104 through 108. If there are no higher resolution levels, the process proceeds to step 112, where the best vector is selected as the motion vector and is used for motion compensation, which completes the process for the current frame.

The advantage of this approach is that at a lower level, an update of a pixel is equivalent to an update of two or more pixels at the next higher level, depending on the difference in resolution between the two levels. If there are, for example, three resolution levels, say 1:1, 1:2 and 1:4, and an update of +/−1 pixel at each level, the convergence delay is potentially reduced by a factor of four. Expressed differently, effectively the resolution hierarchy is used to accelerate the temporal recursion convergence. This results in significant improvements, in particular for frames containing small objects moving with high velocities.

The invention will now be explained in greater detail, by way of example of a recursive hierarchical scheme with three levels of resolution at 1:1, 1:2, and 1:4, with an image patch grid of 4×4 pixels, and with reference to FIGS. 1-4. It should be noted that the vectors shown in FIGS. 2-4 are representative only of this example, and that the number of resolution levels and the number and/or the types of vectors at each resolution level can be varied depending on various factors, such as computational cost, quality, processing speed, and so on.

Figure 3:
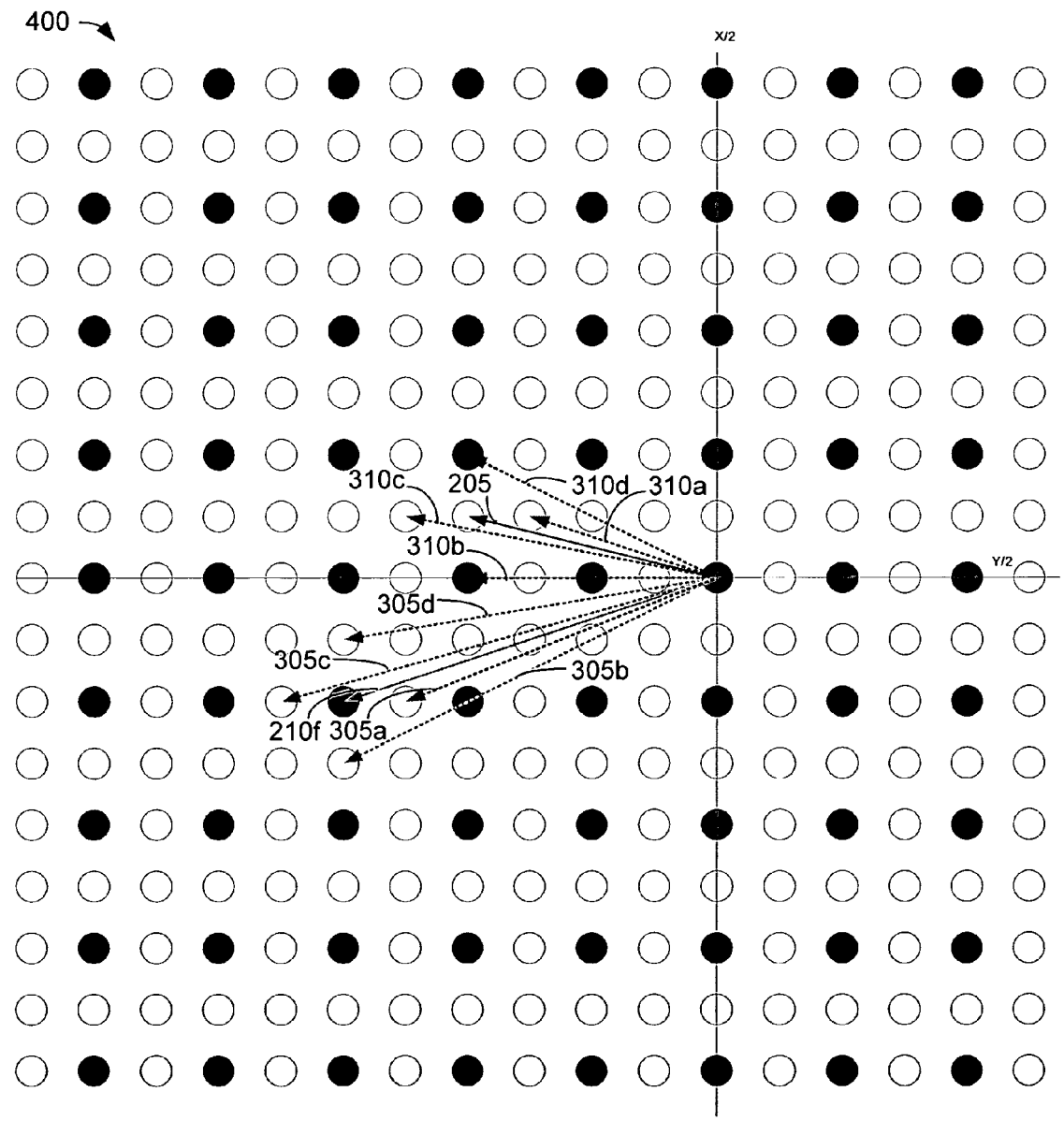
FIG. 3 shows an example of vectors for determining a best motion vector at a resolution of 1:2 of an original resolution of a video frame.
Figure 4:
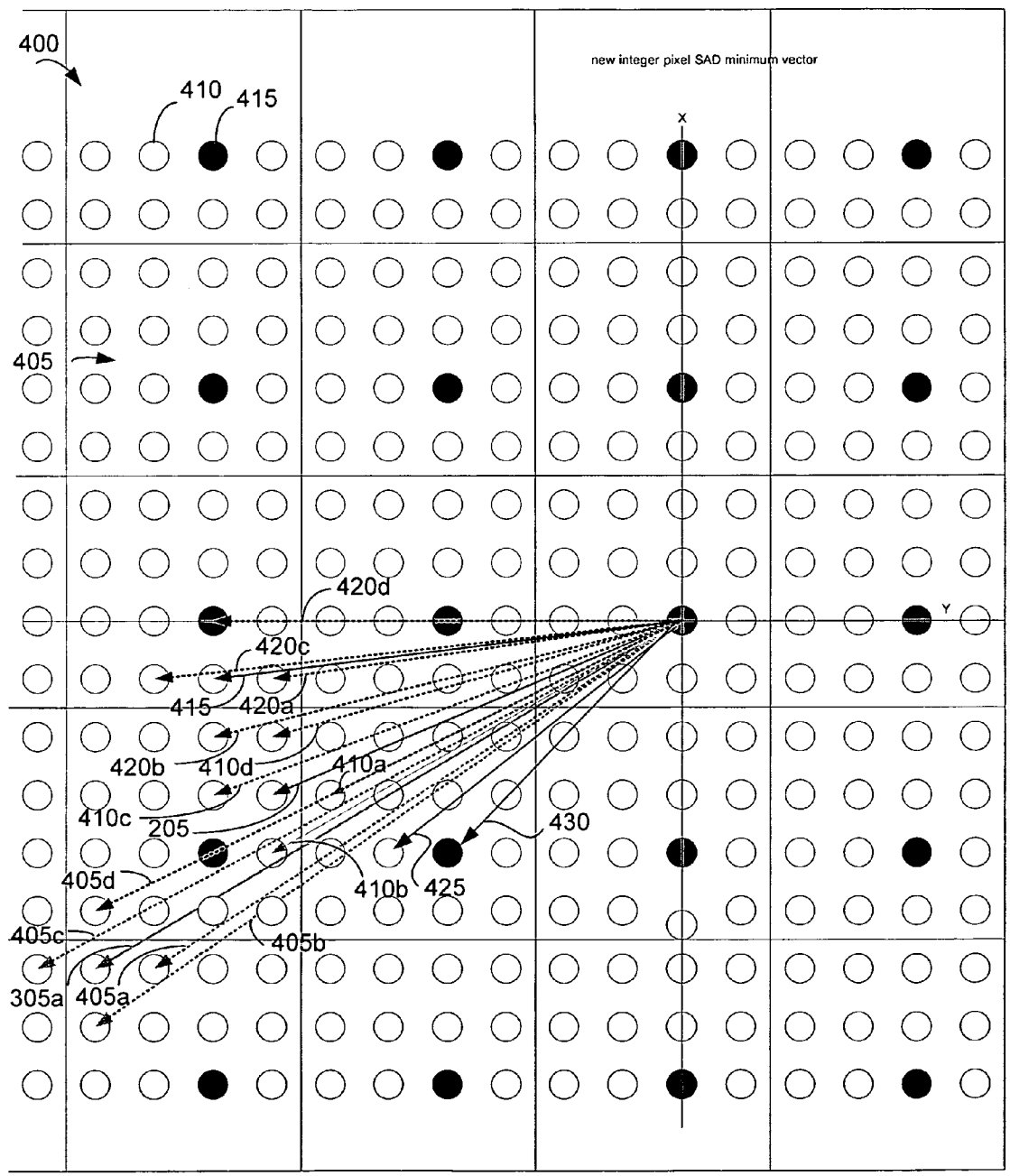
FIG. 4 shows an example of vectors for determining a best motion vector at an original resolution of a video frame.

FIG. 4 shows an image patch grid (400), which is divided into image patches (405) of 4×4 pixels, where each pixel is illustrated as a circle (410). The dark pixels (415) indicate locations at which motion vectors are computed for each 4×4 image patch of pixels. As can be seen in FIG. 4, one motion vector is computed for each 4×4 image patch of pixels and the locations within each 4×4 image patch of the motion vectors' origins are the same. FIG. 3 shows the same pixel grid (400) at half the resolution of the original pixel grid of FIG. 4. FIG. 2 shows the same pixel grid (400) at the lowest resolution, which in the present example is half the resolution of FIG. 3, or a fourth of the resolution of FIG. 4.

Figure 2:
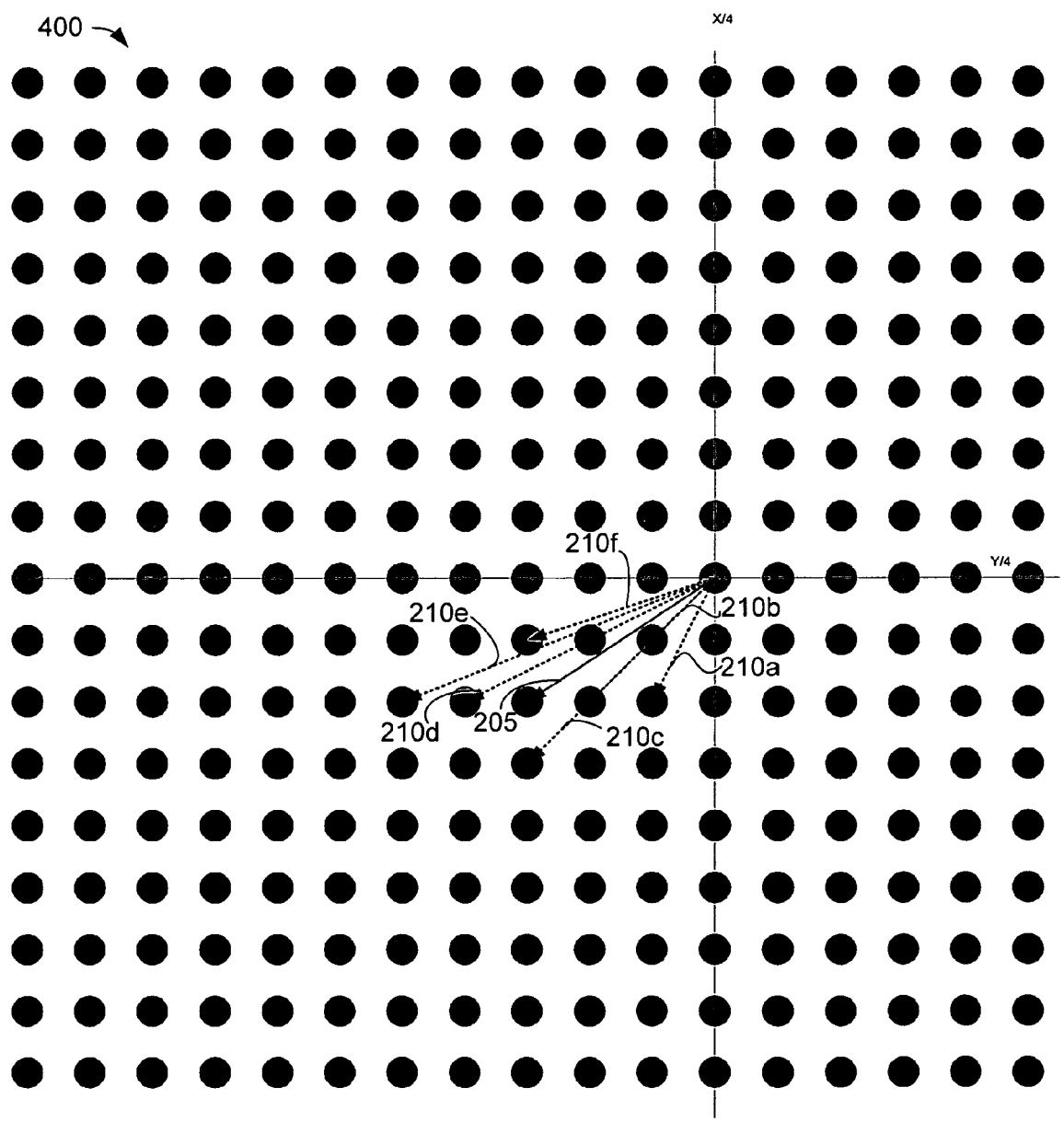
FIG. 2 shows an example of vectors for determining a best motion vector at a resolution of 1:4 of an original resolution of a video frame.

As shown in FIG. 1 and FIG. 2, a recursive hierarchical process for determining a motion vector starts by projecting a motion vector (205) from a previous image down to a lowest resolution level (step 102), which in the present example is 1:4 of the original resolution, and is illustrated in FIG. 2. In one implementation the old motion vector (205) is filtered before it is projected, primarily to take care of cases in which the neighborhood contains an object-background boundary that causes a discontinuity in the vectors. In one implementation, filtering is performed by taking a neighborhood of vectors and either finding a vector median of the set of neighborhood vectors, or performing a temporal partitioning procedure. In both cases, the filtered output is a new base vector at the 1:1 level, which is subsequently projected down to 1:4 level. In the first frame of a sequence, that is, when there is no previous image, the process (100) starts with a zero vector as the old motion vector. In one implementation, the zero vector is also used when there is a scene break in the video, i.e., when there is no continuity between two frames.

A set of update vectors (210a-210f) is generated and tested to find a minimum SAD at +/−1 pixel or +/−2 pixels from the old projected motion vector at this lowest resolution level (step 104). In FIG. 2, six update vectors (210a-210f) are illustrated, two for +/−1 pixel and two for +/−2 pixels in the horizontal direction, and two for +/−1 pixel in the vertical direction, since horizontal movement is generally greater than vertical movement. However, as the reader skilled in the art will realize, any number of update vectors can be generated and tested at any horizontal and/or vertical location in relation to the projected vector (205). In one implementation, a predicted camera vector is also projected down to 1:4 level. The camera vector will be discussed in further detail below.

In one implementation, the SAD is computed by letting the candidate vectors for an image patch, which all originate at the same image patch location in the source frame, point to different pixel locations in a target frame. For each candidate vector, a rectangular window is centered in the target frame on the pixel pointed to by the respective candidate vector. A corresponding rectangular window is centered in the source frame on the pixel where the candidate vectors originate. Then a pair wise absolute difference of the corresponding luma pixels in the two windows, that is, the pixels that have the same relative location within the two windows, is calculated. The sum of all the absolute differences is the SAD value. The SAD decreases as the window matching becomes better and is ideally zero when the pixels are identical. In practice, of course, due to noise and other factors, the best vector will have a non-zero SAD, but will have the minimum SAD of the vectors in the set of candidate vectors.

After the minimum SAD has been found the best vector, that is, the vector with the minimum SAD (210f) is selected and stored in memory (step 106). The process then examines whether there are any higher resolution levels (step 108). As was described above, in this example there are two higher resolution levels, so the process propagates the best vector (210f) is projected up to the 1:2 resolution level shown in FIG. 3 (step 110). Again, a set of update vectors (305a-305d) is generated around the best vector (210f) after it has been projected up to the 1:2 level (step 104). At this level, a second set of update vectors (310a-310d) is also generated around the old 1:1 filtered vector (205) projected down to the 1:2 resolution level. A new best vector (305a) is found, by computing the minimum SAD among all the update vectors, just like on the 1:4 resolution level. The best update vector is then selected and is stored in memory (step 106).

The process then examines again whether there are any higher resolution levels (step 108). At this point, there is one higher resolution level left in the resolution pyramid, so the process returns again to step 104, where the best vector (305a) from the 1:2 resolution level in FIG. 3 is filtered and projected up to the highest 1:1 resolution level shown in FIG. 4. Again, a set of update vectors (405a-405d) is generated around the projected and filtered best vector (305a) (step 104). At this level, a second set of update vectors (410a-410d) is also generated around the old 1:1 filtered vector. A third set of update vectors (420a-420d) is generated around a camera vector (415).

The camera vector describes a global movement of the contents of the frame, as opposed to the local vectors at each image patch location that are computed completely independently, and can therefore be used to aid in finding a better true motion vector. In several commonly occurring scenarios a motion vector resulting from camera movements at every location in a frame can be predicted quite easily with a simple model. For example, in the case of a camera lens panning across a distant landscape, all the motion vectors will be identical and equivalent to the velocity of the camera. Another scenario is when a camera lens zooms into an object on a flat surface, such as a picture on a wall. All the motion vectors then have a radial direction and increase from zero at the image center to a maximum value at the image periphery.

In one implementation, the process tries to fit a mathematical model to the motion vectors that have been computed using a least squares method. A good fit between the camera motion vectors and the mathematical model indicates that one of the scenarios discussed above likely is present, and the camera model predicted vector can then be used as an additional candidate vector in the next recursive hierarchical vector estimation step. Taking the camera vector into consideration is advantageous in that the recursive portion of the recursive hierarchical search is a local search approach, which may converge into a false local minimum instead of the true minimum. The camera predicted vector candidate can potentially help in avoiding detection of false local minima and direct the process towards a true minimum.

The new best vector (405d) is then found, just like on the 1:4 and 1:2 resolution levels (step 106) and is stored in memory. The process then examines again whether there are any higher resolution levels available (step 108). This time there are no higher resolution levels, so the process proceeds to step 112, where the best vector is selected and used for motion compensation, which completes the process for the current frame.

The above process is performed for all the 4×4 image patches of pixels in the frame, and based on the determined motion vectors, an interpolation of frames between a source frame and a target frame can be made, so that there is a minimal or no discrepancy between an expected image motion due to eye-tracking, and a displayed image motion.

As can be seen from the above discussion, the invention provides a smooth and accurate vector field and uses only a fairly small number of calculations. Furthermore, there is reduced convergence delay due to the multiple levels of resolution. Fewer resolution levels can be used compared to conventional approaches, and vector errors in lower levels are not amplified due to resolution changes at higher resolution levels due to safeguarding by use of projected vectors at each resolution.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Figure 5:
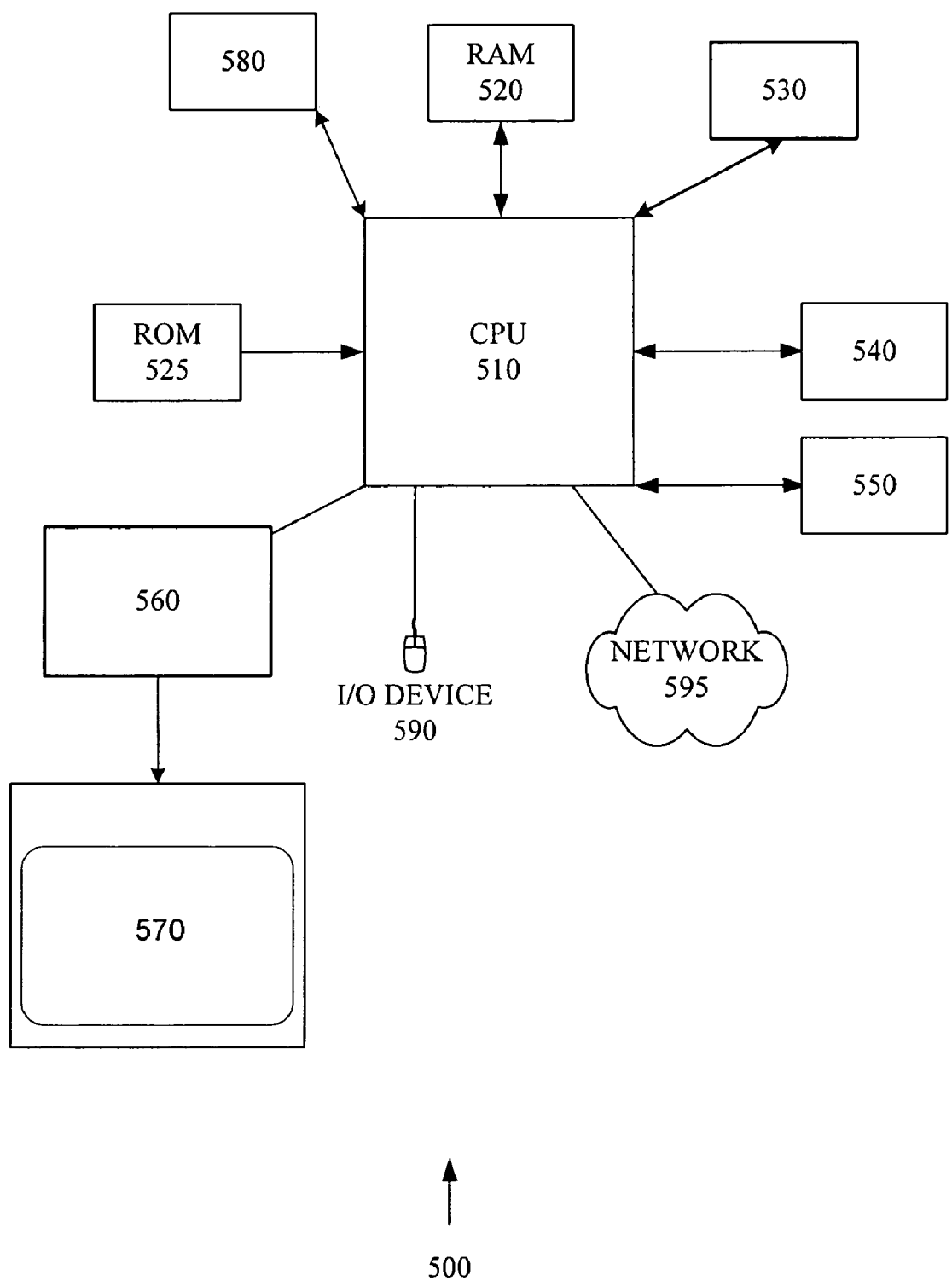
FIG. 5 illustrates a computer system employed to implement the invention.

FIG. 5 shows a computer system 500 employed to implement the invention. The computer system 500 is only an example of a graphics system in which the present invention can be implemented. The computer system 500 includes a central processing unit (CPU) (510), a random access memory (RAM) (520), a read only memory (ROM) (525), one or more peripherals (530), a graphics controller (560), primary storage devices (540 and 550), and a digital display unit (570). As is well known in the art, ROM acts to transfer data and instructions uni-directionally to the CPUs (510), while the RAM (520) is used typically to transfer data and instructions in a bidirectional manner. The CPUs (510) can generally include any number of processors. Both primary storage devices (540 and 550) can include any suitable computer-readable media. A secondary storage medium (580), which is typically a mass memory device, is also coupled bi-directionally to the CPUs (510) and provides additional data storage capacity. The mass memory device (580) is a computer-readable medium that can be used to store programs including computer code, data, and the like. Typically, the mass memory device (580) is a storage medium such as a hard disk or a tape which generally slower than the primary storage devices (540, 550). The mass memory storage device (580) can take the form of a magnetic or paper tape reader or some other well-known device.

It will be appreciated that the information retained within the mass memory device (580), can, in appropriate cases, be incorporated in standard fashion as part of the RAM (520) as virtual memory.

The CPUs (510) are also coupled to one or more input/output devices (590) that can include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs (510) optionally can be coupled to a computer or telecommunications network, e.g., an Internet network or an intranet network, using a network connection as shown generally at (595). With such a network connection, it is contemplated that the CPUs (510) might receive information from the network, or might output information to the network in the course of performing the above-described method steps. Such information, which is often represented as a sequence of instructions to be executed using the CPUs (510), can be received from and outputted to the network, for example, in the form of a computer data signal embodied in a carrier wave. The above-described devices and materials will be familiar to those of skill in the computer hardware and software arts.

The graphics controller (560) generates image data and a corresponding reference signal, and provides both to digital display unit (570). The image data can be generated, for example, based on pixel data received from the CPU (510) or from an external encode (not shown). In one embodiment, the image data is provided in RGB format and the reference signal includes the VSYNC and HSYNC signals well known in the art. However, it should be understood that the present invention can be implemented with data and/or reference signals in other formats.

A number of implementations of the invention have been described. Nevertheless, it will be understood that various modifications can be made without departing from the spirit and scope of the invention. For example in addition to the hierarchical and temporal vectors in the intermediate layers, the camera model generated vector projected down can also be used as a candidate for SAD computation. Accordingly, other embodiments are within the scope of the following claims.

The invention claimed is:

1. A method for computing motion vectors in a digital video sequence, comprising:

receiving a first image frame at a first resolution, the first image frame including a plurality of image patches, wherein each image patch has a respective first position;

receiving a second image frame at the first resolution, the second image frame including one or more image patches corresponding to the image patches in the first image frame, wherein each image patch has a respective second position;

for each image patch in the first image frame that has a corresponding image patch in the second image frame;

determining a motion vector for the image patch, the determination including generating two or more copies of each of the first and second image frames, each copy having a different, lower, resolution than the first resolution, and selecting a best motion vector among a plurality of vectors at each resolution; and using the determined motion vector to establish an intermediate position of the image patch in an interpolated frame that is intermediary to the first and second frames.

2. The method of claim 1, wherein determining further includes:
a) selecting a copy of the first image frame at the lowest resolution;
b) selecting a motion vector determined for a previous pair of image frames;
c) projecting the selected motion vector to the selected copy of the first image frame;
d) generating one or more update vectors in the selected copy of the first image frame;
e) selecting a new best motion vector among the projected vector and the update vectors;
f) selecting a new copy of the first image frame with a higher resolution level;
g) repeating steps c) through f) until the first resolution is reached; and
h) using the selected best motion vector at the first resolution level as the determined motion vector.

3. The method of claim 1, wherein each image patch includes a plurality of pixels.

4. The method of claim 3, wherein the size of each image patch is 8 by 8 pixels.

5. The method of claim 2, wherein generating two or more copies includes:
generating two copies of each of the first and second image frames, each copy having a different, lower, resolution than the first resolution.

6. The method of claim 2, wherein selecting a motion vector determined for a previous pair of image frames includes:
selecting a zero vector to be the motion vector if no continuity exists between the previous pair of image frames and the first image frame, or if no previous pair of image frames exists.

7. The method of claim 2, wherein selecting a motion vector determined for a previous pair of image frames includes:
filtering the motion vector determined from the previous pair of image frames.

8. The method of claim 7, wherein filtering includes:
determining a vector median in a set of two or more motion vectors for the previous pair of image frames.

9. The method of claim 7, wherein filtering includes:
performing a temporal partitioning procedure in a set of two or more motion vectors for the previous pair of image frames.

10. The method of claim 2, wherein generating one or more update vectors includes:
generating one or more vectors that have the same origin as the selected motion vector and that end at different pixels in a horizontal direction or a vertical direction from the pixel where the selected motion vector ends.

11. The method of claim 10, wherein the update vectors end at pixels that are separated by one or two pixels from the pixel where the selected motion vector ends in a horizontal and/or vertical direction.

12. The method of claim 2, wherein selecting a new best motion vector includes:
for each of the selected motion vector and the update vectors:
centering a first window on a pixel in the first image frame that forms an origin of the vector;
centering a second window on a pixel in the second image frame that forms an end point of the vector, the second window having the same dimensions as the first window;
determining a sum of absolute differences of luma values for the pixels in the first window and pixels at corresponding positions in the second window; and
selecting as the new best motion vector a vector that has a minimum sum of absolute differences.

13. The method of claim 12, wherein the dimensions of the first and second windows are identical to the dimensions of the image patch.

14. The method of claim 1, wherein determining further includes:
projecting a camera vector to the selected copy of the first image frame, the camera vector describing a global motion between the first and second image frames; and
selecting a new best motion vector among the projected vector, the update vectors, and the camera vector.

15. A computer program product, stored on a machine-readable medium, comprising instructions operable to cause a computer to:
receive a first image frame at a first resolution, the first image frame including a plurality of image patches, wherein each image patch has a respective first position;
receive a second image frame at the first resolution, the second image frame including one or more image patches corresponding to the image patches in the first image frame, wherein each image patch has a respective second position;
for each image patch in the first image frame that has a corresponding image patch in the second image frame:
determine a motion vector for the image patch, the instructions to determine including instructions to generate two or more copies of each of the first and second image frames, each copy having a different, lower, resolution than the first resolution, and select a best motion vector among a plurality of vectors at each resolution; and
use the determined motion vector to establish an intermediate position of the image patch in an interpolated frame that is intermediary to the first and second frames.

16. The computer program product of claim 15, wherein the instructions to determine further include instructions to:
a) select a copy of the first image frame at the lowest resolution;
b) select a motion vector determined for a previous pair of image frames;
c) project the selected motion vector to the selected copy of the first image frame;
d) generate one or more update vectors in the selected copy of the first image frame;
e) select a new best motion vector among the projected vector and the update vectors;
f) select a new copy of the first image frame with a higher resolution level;
g) repeat steps c) through f) until the first resolution is reached; and
h) use the selected best motion vector at the first resolution level as the determined motion vector.

17. The computer program product of claim 16, wherein each image patch includes a plurality of pixels.

18. The computer program product of claim 17, wherein the size of each image patch is 8 by 8 pixels.

19. The computer program product of claim 16, wherein the instructions to generate two or more copies include instructions to:
  generate two copies of each of the first and second image frames, each copy having a different, lower, resolution than the first resolution.

20. The computer program product of claim 16, wherein the instructions to select a motion vector determined for a previous pair of image frames include instructions to:
  select a zero vector to be the motion vector if no continuity exists between the previous pair of image frames and the first image frame, or if no previous pair of image frames exists.

21. The computer program product of claim 16, wherein the instructions to select a motion vector determined for a previous pair of image frames include instructions to:
  filter the motion vector determined from the previous pair of image frames.

22. The computer program product of claim 21, wherein the instructions to filter include instructions to:
  determine a vector median in a set of two or more motion vectors for the previous pair of image frames.

23. The computer program product of claim 21, wherein the instructions to filter include instructions to:
  perform a temporal partitioning procedure in a set of two or more motion vectors for the previous pair of image frames.

24. The computer program product of claim 16, wherein the instructions to generate one or more update vectors include instructions to:
  generate one or more vectors that have the same origin as the selected motion vector and that end at different pixels in a horizontal direction or a vertical direction from the pixel where the selected motion vector ends.

25. The computer program product of claim 24, wherein the update vectors end at pixels that are separated by one or two pixels from the pixel where the selected motion vector ends in a horizontal and/or vertical direction.

26. The computer program product of claim 16, wherein the instructions to select a new best motion vector include instructions to:
  for each of the selected motion vector and the update vectors:
    center a first window on a pixel in the first image frame that forms an origin of the vector;
    center a second window on a pixel in the second image frame that forms an end point of the vector, the second window having the same dimensions as the first window;
    determine a sum of absolute differences of luma values for the pixels in the first window and pixels at corresponding positions in the second window; and
  select as the new best motion vector a vector that has a minimum sum of absolute differences.

27. The computer program product of claim 26, wherein the dimensions of the first and second windows are identical to the dimensions of the image patch.

28. The computer program product of claim 16, wherein the instructions to determine further include instructions to:
  project a camera vector to the selected copy of the first image frame, the camera vector describing a global motion between the first and second image frames; and
  select a new best motion vector among the projected vector, the update vectors, and the camera vector.

* * * * *